United States Patent
Ge et al.

(10) Patent No.: US 8,824,603 B1
(45) Date of Patent: Sep. 2, 2014

(54) BI-DIRECTIONAL RING-BUS ARCHITECTURE FOR CORDIC-BASED MATRIX INVERSION

(71) Applicant: Futurewei Technologies, Inc., Dallas, TX (US)

(72) Inventors: Yiqun Ge, Ottawa (CA); Qifan Zhang, Lachine (CA); Peter Man Kin Sinn, Ottawa (CA)

(73) Assignee: Futurewei Technologies, Inc., Dallas, TX (US)

( * ) Notice: Subject to any disclaimer, the term of this patent is extended or adjusted under 35 U.S.C. 154(b) by 0 days.

(21) Appl. No.: 13/782,328

(22) Filed: Mar. 1, 2013

(51) Int. Cl.
*H04L 27/06* (2006.01)

(52) U.S. Cl.
USPC ........... 375/340; 375/260; 375/267; 375/347; 455/101; 455/132; 455/500; 455/562.1; 708/19; 708/322; 708/407; 708/446; 708/520; 708/522; 708/523; 370/464

(58) Field of Classification Search
USPC .......... 375/260, 267, 340, 347; 455/101, 132, 455/500, 562.1; 370/464; 708/19, 322, 407, 708/446, 520, 522, 523
See application file for complete search history.

(56) References Cited

U.S. PATENT DOCUMENTS

| | | | |
|---|---|---|---|
| 7,716,454 B2 * | 5/2010 | Fitton | 712/1 |
| 7,933,353 B2 * | 4/2011 | Maltsev et al. | 375/267 |
| 8,195,733 B2 * | 6/2012 | Seki | 708/520 |
| 2003/0018675 A1 * | 1/2003 | Asai et al. | 708/322 |
| 2009/0116588 A1 * | 5/2009 | McNamara et al. | 375/340 |
| 2010/0250640 A1 * | 9/2010 | Seki | 708/522 |

* cited by examiner

Primary Examiner — Leon Flores

(57) ABSTRACT

A method and a system is provided for Coordinate Rotation Digital Computer (CORDIC) based matrix inversion of input digital signal streams from multiple antennas using an bi-directional ring-bus architecture. The bi-directional ring bus includes a first ring bus having signals flow in a clockwise direction, and a second ring bus having signals flow in a counter-clockwise direction. An I/O controller is coupled to the first and the second ring bus, respectively. A plurality of processing elements (PEs), where each of the plurality of PEs is coupled to the first and the second ring bus, respectively, wherein each of the plurality of PEs includes at least one CORDIC core for performing CORDIC iterations on the plurality of input digital stream signals to produce inversed matrix signals.

20 Claims, 9 Drawing Sheets

BI-DIRECTIONAL RING-BUS ARCHITECTURE FOR CORDIC-BASED MATRIX INVERSION

FIELD OF THE TECHNOLOGY

The present application relates to the field of processing and equalization of signals received from multiple antennas, using QR decomposition (QRD) based matrix inversion algorithms. More particularly the present application provides a method and system which implements a bi-directional ring-bus architecture using Coordinate Rotation Digital Computer (CORDIC) cores to perform the complex task of QRD based matrix inversion of multiple input digital signal streams in Long Term Evolution (LTE) application.

BACKGROUND

Multiple input/multiple output (MIMO) antenna deployment has become one of the most important techniques for enhancing system capacity and improving receiver performance in fourth generation (4G) high-speed wireless communication, under the Long Term Evolution (LTE) standard and the IEEE 802.16 WiMAX standard.

Signals received by each of the antenna ports are converted to a digital signal stream. Each digital signal stream is synchronized, having the carrier frequency offset removed, digitally and automatically gain controlled, scaled, and associated to an estimated channel coefficient (H). The digital signal streams from the multiple antennas are then equalized through a complex-valued mathematical operation, namely, a matrix inversion.

The complexity of the matrix inversion is related to the MIMO antenna's dimension (i.e., number of antennas used). An increase in the MIMO antenna's dimension improves system performance by increasing data throughput, but comes with an increased challenge on the algorithm, which performs the matrix inversion. The matrix inversion may be performed through software-oriented and hardware-oriented matrix inversion algorithms, where each has its advantages and shortcomings.

Software-oriented matrix inversion algorithms, such as the Gaussian, Cofactor and Blockwise algorithms may be implemented via programmed instructions on a digital signal processor (DSP). Software oriented matrix inversion algorithms are flexible due to the programmable nature of the algorithms. These algorithms are able to achieve a high degree of precision. However, the software algorithms are not suitable for a large antenna matrix size, because significant computing power is required.

A hardware oriented matrix inversion algorithm approach uses hard coded pipeline processing elements (PE) to perform complex valued matrix inversions. One well-known hardware oriented matrix inversion application utilizes a systolic array to perform matrix inversion on the multiple input digital signal streams. It is well known in the art that a systolic array processes signals in both the horizontal direction (West to East) and in the vertical direction (North to South) simultaneously.

FIGS. 1A and 1B illustrate an application of a systolic array (150) performing a 4×4 matrix inversion on LTE digital signal streams (132a to 132d). More specifically, FIG. 1A illustrates that the systolic array (150) may carry out a known (QR Decomposition) QRD based matrix inversion algorithm in two stages, namely, QR decomposition operations in the first triangular processing block (120), back-substitution (BS) and back-substitution delay (BSD) operations in the second triangular processing block (122). A total of 16 processing elements (PEs) and four delay units (−1A to −1D) (see FIG. 1A) may be employed in both processing blocks (120, 122) of the systolic array (150). The PEs for the QRD may be designated as QR-PE. The PEs for the back-substitution may be designated as BS-PE, and the PE for the back-substitution delay may be designated as BSD-PE. Each of the processing elements (PEs) typically implements four CORDIC cores (not shown), arranged as two series cascaded CORDIC cores in parallel arrangement. The structure and function of a CORDIC core is well known in the art.

Referring to both FIGS. 1A and 1B, input digital signal streams (132a to 132d) are fed as input matrix A into the systolic array (150) one column at a time at a constant rate. After the $14^{th}$ step, the first element of the inversed matrix $A^{-1}$ is output from the systolic array (150) as output streams (142a to 142d).

FIG. 1B illustrates that the input matrix (106) is deliberately skewed due to the fact that every PE of a systolic array (150) needs to be triggered by two inputs (i.e., from the West and from the North directions) simultaneously. In addition, a PE may function as a memory node for the parameters from the last matrix. Therefore, starting zeros (102) and ending zeros (104) are inserted to the matrix to ensure that every PE is properly reset between two consecutive column matrix inputs (106a, 106b). In addition, four delay units (−1A to −1D) (see FIG. 1A) are used in the systolic array (150) to synchronize the consecutive column matrix inputs (106a, 106b) to each other. Accordingly, the output data streams (142a to 142d) as inversed matrix (e.g., 116) from the systolic array (150) are also skewed by the same starting zeros (112) and ending zeros (114), respectively.

It may be pointed out that multiple users in MIMO (MU-MIMO) require matrix inversions to be performed in parallel. In this regard, performing 2×2 matrix inversions in parallel (not shown) for MU-MIMO may require four independent systolic arrays, which may contain a total of 4 QR-PEs, 4 BS-PEs, 8 BSD-PEs and 8 delay units (not shown). When configuring a 16 PEs systolic array (150) of 4×4 matrix inversion (e.g., see FIG. 1A) to perform a 2×2 matrix inversion, only two systolic arrays may be achieved from the 16 PEs systolic array, thus wasting a large portion of the QR-PEs and BS-PEs. In addition, the latency and the power consumption of running all 64 CORDIC cores may not reduce significantly when performing the 2×2 matrix inversion.

Therefore, even though the above systolic array (150) hardware matrix inversion algorithm approach has the advantages of high processing speed and high throughput, it nevertheless has at least the following disadvantages: (1) inflexible architecture, which cannot be scaled or configured to adapt to systems using different MIMO dimensions (i.e., having more or fewer antennas); (2) fixed precision, which cannot be configured to achieve a higher or lower precision based on system architecture or performance requirement; (3) high latency, the high number of CORDIC cores used and number of iterations required for the inversion algorithm, and the need of synchronizing input matrix columns by inserting starting zeros (102) and ending zeros (104) to reset memories causes processing delays, especially when the matrix size increases for large MIMO dimensions; (4) increase area size and power consumption due to high number of CORDIC cores in each PE, especially when the matrix size increases for large MIMO dimensions.

SUMMARY

The disclosure addresses the above disadvantages in both software and hardware matrix inversion algorithms approach by implementing a bi-directional ring-bus architecture using CORDIC cores to perform matrix inversion of input digital signal streams from multiple antennas.

In one aspect, a method for processing multiple antenna signals includes: receiving input signals from multiple antennas, converting the received input signals into a plurality of input digital signal streams, and performing QR decomposition (QRD) based matrix inversion on the plurality of input digital signal streams via a bi-directional ring bus processing architecture. The bi-directional ring bus processing architecture includes a bi-directional ring bus, with a first ring bus having signals flow in a clockwise direction, a second ring bus having signals flow in a counter-clockwise direction. An input/output (/O) controller is coupled to the first and the second ring bus, respectively. The bi-directional ring bus processing architecture also includes a plurality of processing elements (PEs). Each of the plurality of PEs is coupled to the first and the second ring bus, respectively, and includes at least one Coordinate Rotation Digital Computer (CORDIC) core for performing CORDIC iterations on the plurality of input digital signal streams to produce inversed matrix signals.

In a second aspect, an apparatus for processing multiple antenna signals include a receiver which receives input signals from multiple antennas; one or more processing circuits which processes the received input signals into a plurality of input digital signal streams; a bi-directional ring bus processing architecture which performs QR decomposition (QRD) based matrix inversion on the plurality of input digital signal streams, wherein the bi-directional ring bus processing architecture includes: a bi-directional ring bus, with a first ring bus having signals flow in a clockwise direction, a second ring bus having signals flow in a counter-clockwise direction; an input/output (/O) controller coupled to the first and the second ring bus, respectively; a plurality of processing elements (PE), each of the plurality of PEs is coupled to the first and the second ring bus, respectively, wherein each of the plurality of PEs comprises at least one Coordinate Rotation Digital Computer (CORDIC) core for performing CORDIC iterations on the plurality of input digital signal streams to produce inversed matrix signals.

In a third aspect, a matrix computation unit includes a bi-directional ring bus processing architecture which performs QR decomposition (QRD) based matrix inversion on a plurality of input digital signal streams, wherein the bi-directional ring bus processing architecture having: a bi-directional ring bus, with a first ring bus having signals flow in a clockwise direction, a second ring bus having signals flow in a counter-clockwise direction; an input/output (I/O) controller coupled to the first and the second ring bus, respectively; a plurality of processing elements (PE), each of the plurality of PEs is coupled to the first and the second ring bus, respectively, wherein each of the plurality of PEs comprises at least one Coordinate Rotation Digital Computer (CORDIC) core for performing CORDIC iterations on the plurality of input digital signal streams to produce inversed matrix signals.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

FIG. 3A illustrates a configuration of implementing a bi-directional ring-bus architecture using CORDIC cores to perform four 2×2 matrix inversions in parallel to process input digital signal streams from four multiple antenna ports, according to an embodiment of disclosure;

DETAILED DESCRIPTION OF THE EMBODIMENTS

The problems described above are overcome by providing a method and system for processing digital signal streams using a bi-directional ring-bus processing architecture and using CORDIC cores to perform matrix inversion of input digital signal streams from multiple antennas.

Figure 2A:
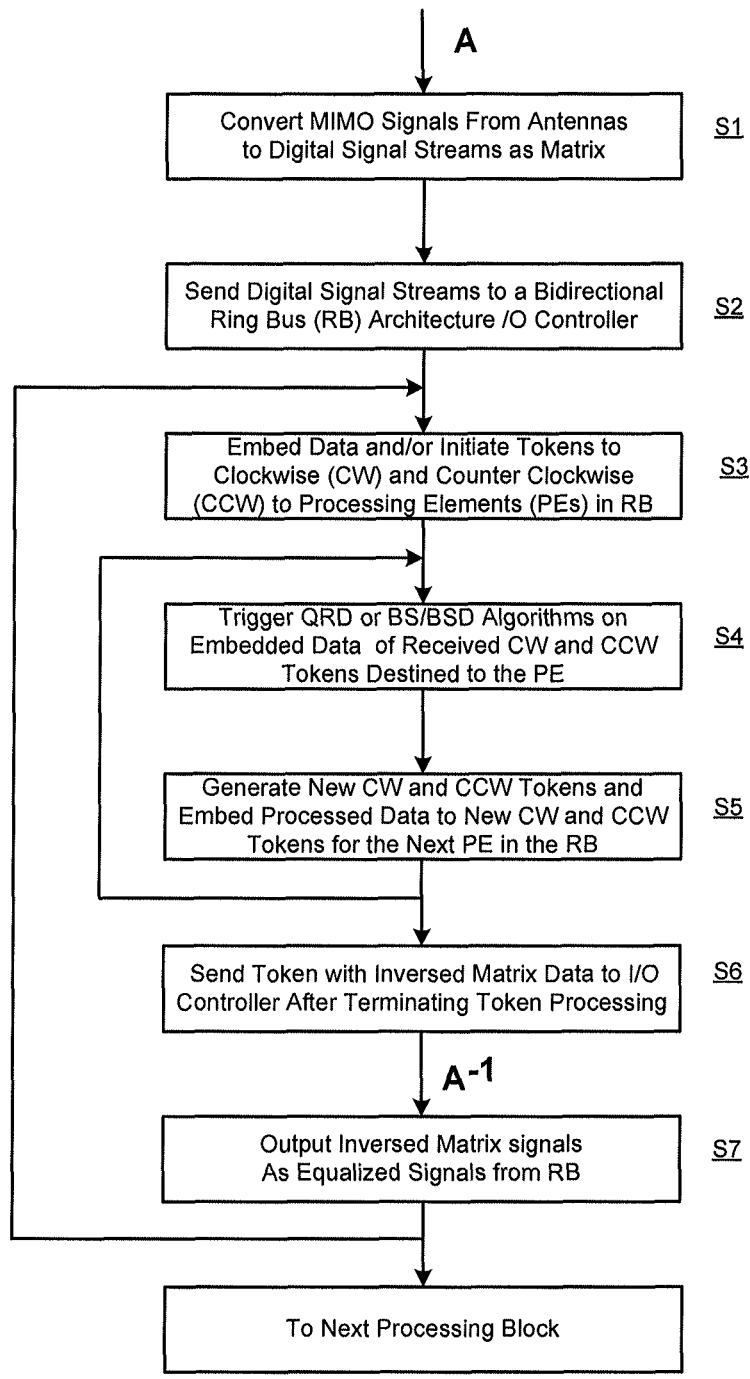
FIG. 2A is a flow chart, which illustrates exemplary steps of implementing a bi-directional ring-bus architecture using CORDIC cores to perform matrix inversion of input digital signal streams from multiple antennas, according to an embodiment of disclosure.
Figure 2B:
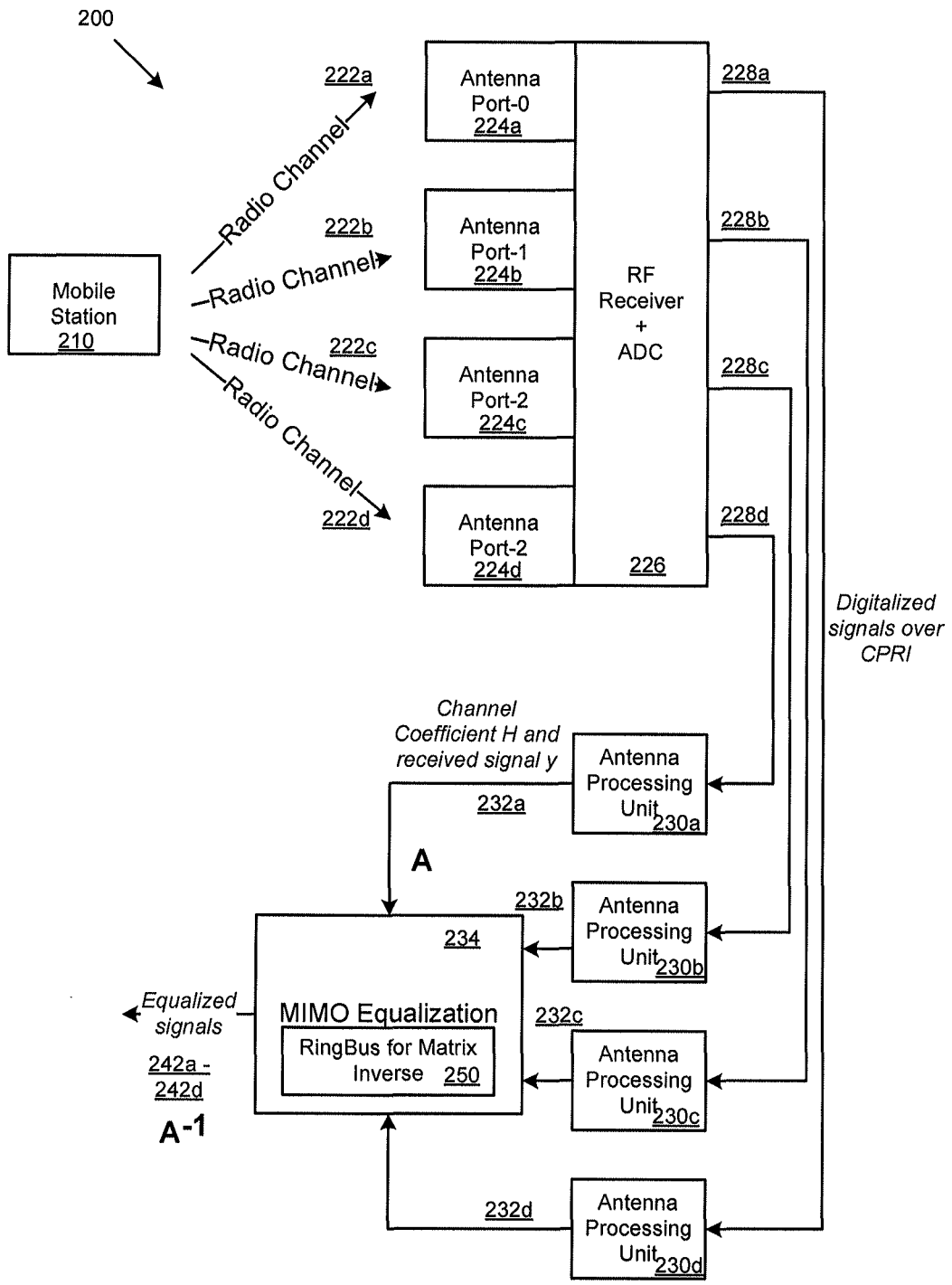
FIG. 2B is an exemplary system block diagram illustrating an implementation of a bi-directional ring-bus architecture using CORDIC cores to perform matrix inversion of input digital signal streams from multiple antennas, according to an embodiment of disclosure.

FIG. 2A is a flow chart, which illustrates exemplary operations for implementing a bi-directional ring-bus architecture using CORDIC cores to perform matrix inversion of input digital signal streams from multiple antennas, according to an embodiment of disclosure. FIG. 2B is an exemplary system block diagram (200), which implements bi-directional ring-bus architecture using CORDIC cores to perform matrix inversion of input digital signal streams from multiple antennas. For expediency, FIG. 2B will be referenced to when describing the exemplary steps in FIG. 2A.

At block S1, illustrates that MIMO signals (i.e., RF channels (222a to 222d)), which are received from respective multiple antenna ports (224a to 224d), are converted into digitized signals (228a to 228d). A RF receiver having an analog to digital converter (ADC) may facilitate such conversion. The digitized signals (228a to 228d) may further be processed by respective antenna processing units (230a to 230d) into a plurality of respective digital signal streams (232a to 232d), having respective channel coefficients (H) extracted ready for equalization or matrix inversion calculation in a MIMO equalization processing block (234).

At block S2, the plurality of digital signal streams (232a to 232d) are sent to a bi-directional ring-bus architecture (250) for equalization, where matrix inversion operations on the received digital signal streams (232a to 232d) may take place. More specifically, the bi-directional ring-bus architecture includes an input/output (I/O) controller, a plurality of processing elements (PEs), and a ring-bus having a clockwise ring and a counter-clockwise ring (bi-directional ring-bus).

At block S3, the (I/O) controller (of the bi-directional ring-bus architecture) generates two respective initial tokens designated to a specific processing element (PE) within the bi-directional ring-bus architecture. Instructions are pre-loaded into a control block in each of the PEs within the bi-directional ring-bus architecture. The respective initial tokens carry embedded data from a respective digital signal stream, and the respective initial tokens are respectively transmitted or dispatched to the clockwise ring as clockwise ring token and to the counter-clockwise ring as counter-clockwise ring token.

At block S4, the designated PE awaits the arrival of the designated clockwise ring token and the counter-clockwise ring token. The arrival of both the designated clockwise ring token and the counter-clockwise ring token may trigger the designated PE to start processing the embedded data according to the instructions preloaded into the PE. The processing may include at least executing algorithms to perform one of: QRD, back substitution or back substitution delay operations.

At block S5, after the designated PE completes the processing of the embedded data according to the instructions preloaded into the PE, the designated PE may generate and dispatch another new clockwise ring token and counter-clockwise ring token to a next designated PE to carry out a next processing step.

The designated PE may repeat the operations between blocks S4 and block S5, until the arrival of a next clockwise ring token and a next counter-clockwise ring token to trigger processing of a next data. Otherwise the operations continue from block S6.

At block S6, if the instructions preloaded into the PE indicate that the pending processing by the designated PE is the final step, the designated PE may generate and transmit a terminating clockwise ring token and a terminating counter-clockwise ring token to the I/O controller. In other words, the inversed matrix operation on the received data could have been completed by step S6.

Figure 3A:
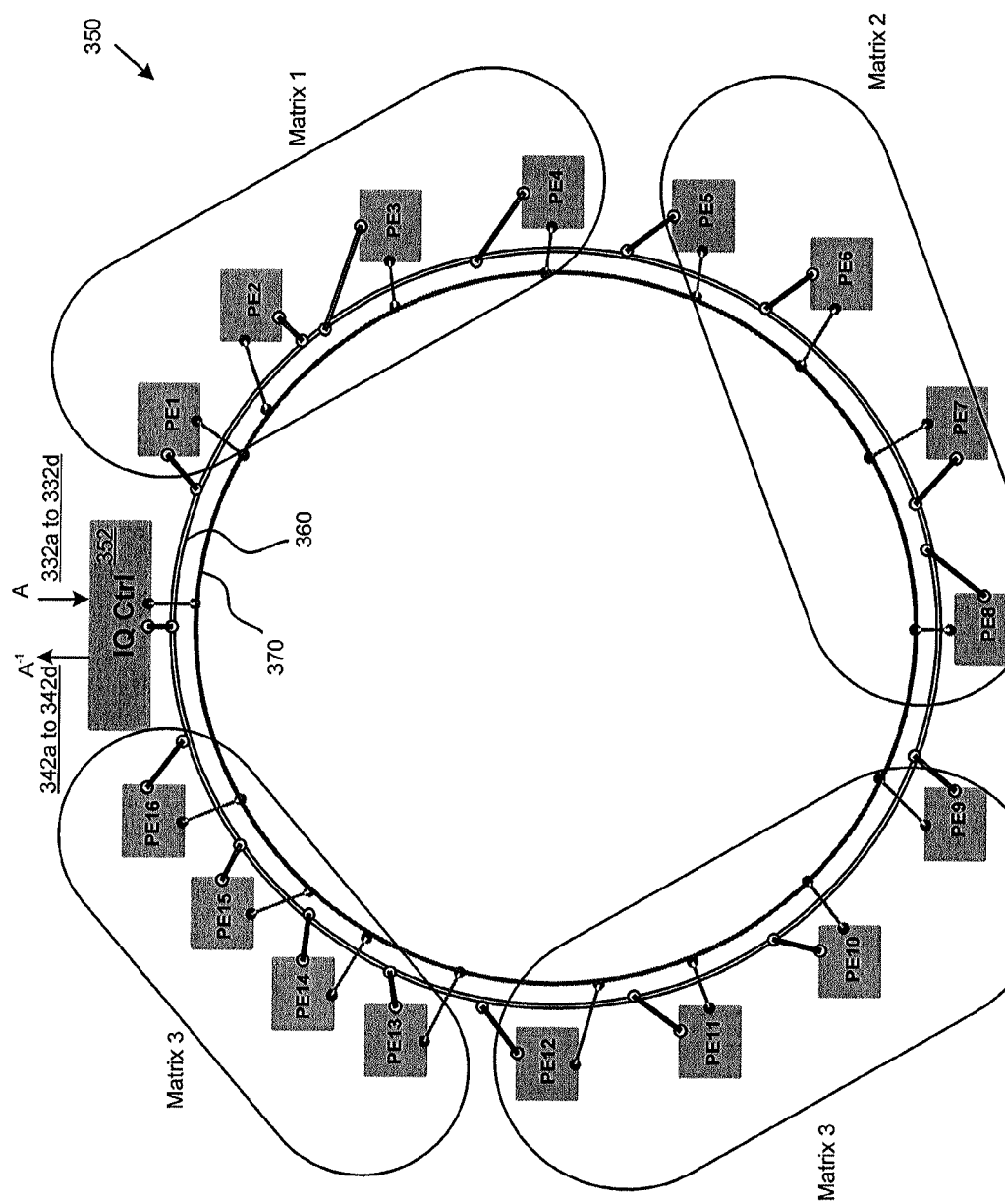
FIG. 3A illustrates a configuration of implementing a bi-directional ring-bus architecture using CORDIC cores to perform matrix inversion of input digital signal streams from multiple antennas, according to an embodiment of disclosure. More specifically.
Figure 3B:
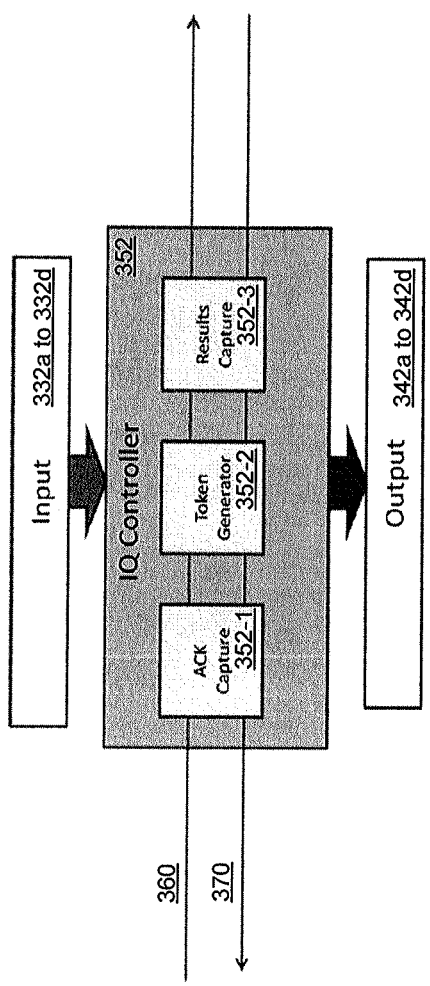
FIG. 3B illustrates an exemplary input/output (I/O) controller coupled to the bi-directional ring bus architecture of FIG. 3A, which initiates tokens to processing elements (PEs) to perform matrix inversion of input digital signal streams from multiple antennas, according to an embodiment of disclosure.
Figure 3C:
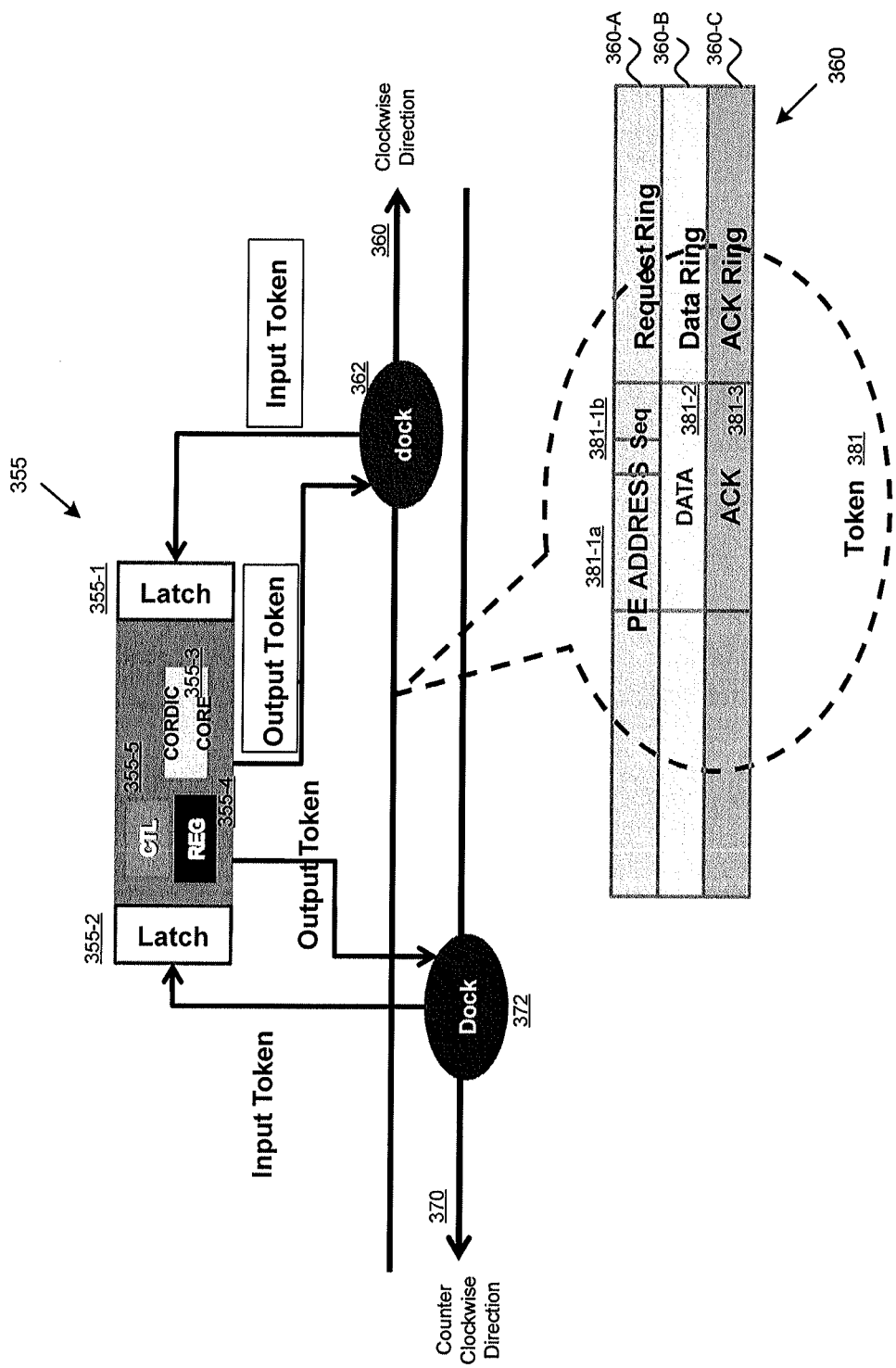
FIG. 3C illustrates an exemplary processing element (PE) coupled to the bi-directional ring-bus architecture of FIG. 3A to perform matrix inversion of input digital signal streams from multiple antennas, according to an embodiment of disclosure.
Figure 3D:
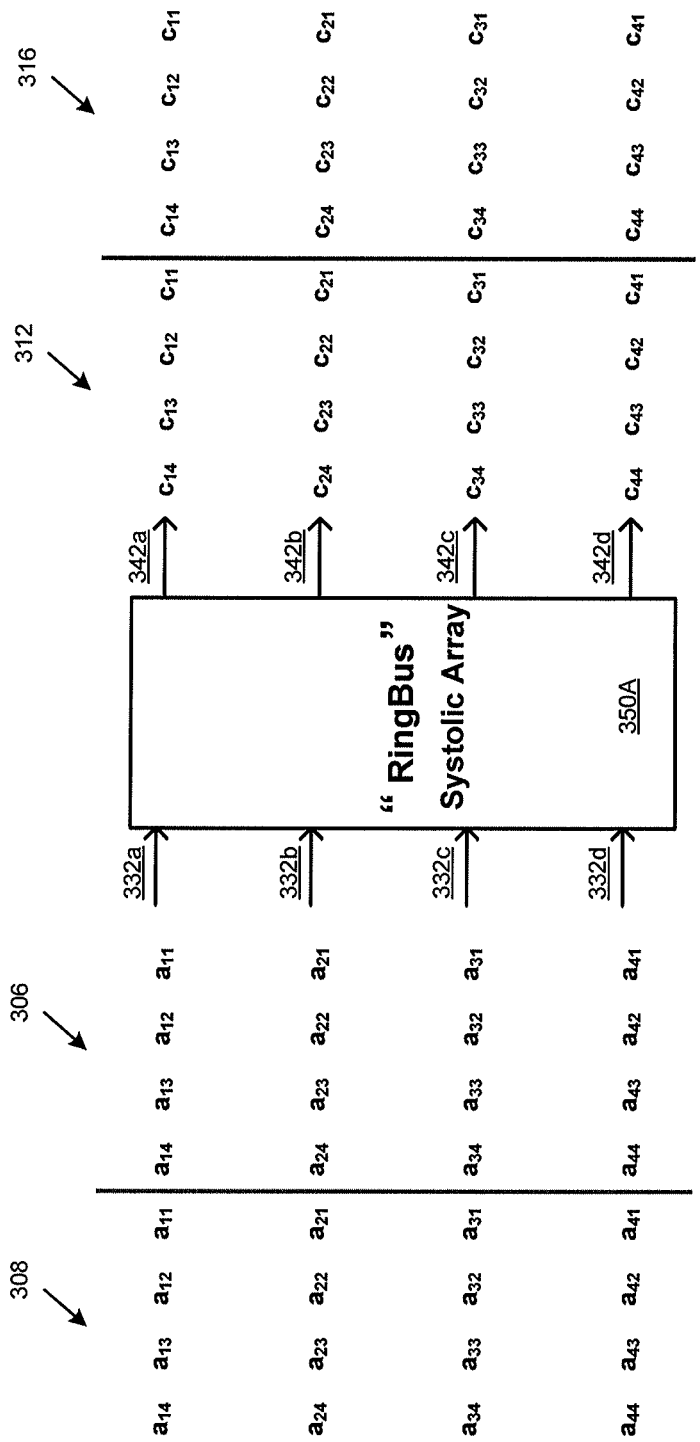
FIG. 3D illustrates implementing a bi-directional ring-bus architecture of FIG. 3A to perform matrix inversion of input digital signal streams from multiple antennas, without requiring the column data of input matrix deliberately skewed prior to processing, according to an embodiment of disclosure.
Figure 3F:
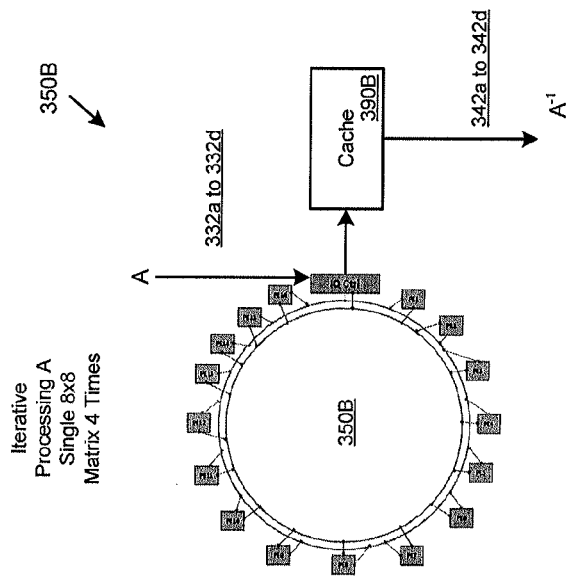
FIG. 3F illustrates using the same single bi-directional ring-bus architecture of FIG. 3A to perform matrix inversion of input digital signal streams from an increased multiple antennas size, according to an embodiment of disclosure.
Figure 3E:
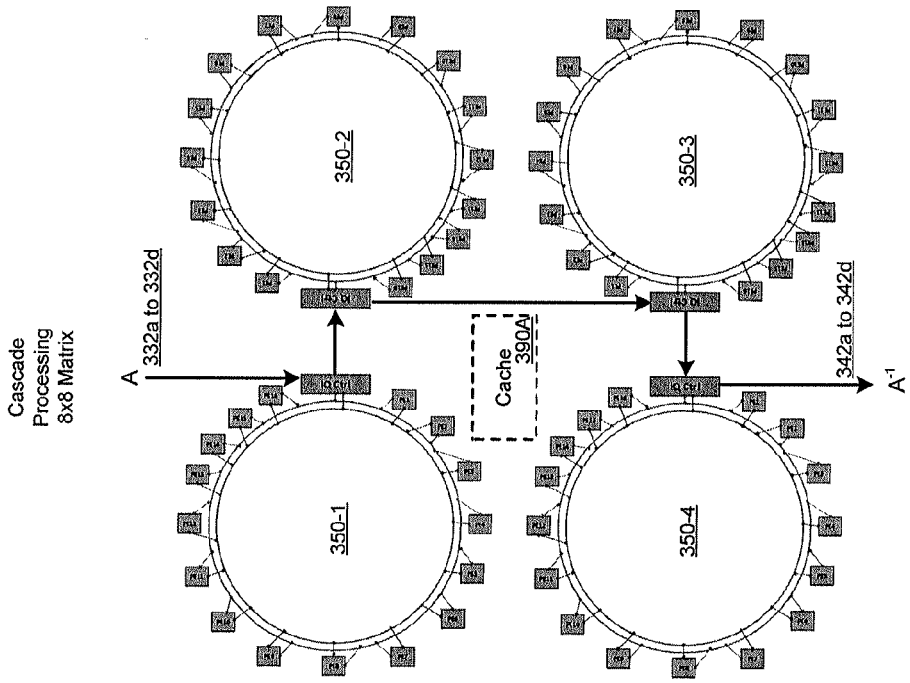
FIG. 3E illustrates using a multiple bi-directional ring-bus configuration to perform matrix inversion of input digital signal streams from an increased multiple antennas size, according to an embodiment of disclosure.

At block S7, the I/O controller may output or transmit the completed data from the received terminating clockwise ring token and the terminating counter-clockwise ring token to be further processed by another processing block, such as to a DSP, to another processor, or to another bi-directional ring-bus architecture for another round of matrix inversion (see FIG. 3E). Alternately, the I/O controller may reuse the completed data, and re-initiate a new clockwise ring token and a new counter-clockwise ring token, and to restart another round of matrix inversion (see FIG. 3F).

FIG. 3A illustrates a configuration for implementing a bi-directional ring-bus architecture (350) using CORDIC cores to perform matrix inversion of input digital signal streams (332a to 332d) from multiple antennas, according to an embodiment of disclosure. The bi-directional ring-bus architecture (350) may include an input/output (I/O) controller (352), a plurality of processing elements (such as PE1 to PE16), a clockwise ring (360) and a counter-clockwise ring (370). The I/O controller (352) and the plurality of PEs (PE1 to PE16) are each coupled to the clockwise ring (360) and the counter-clockwise ring (370), respectively.

One advantage of the ring-bus architecture is that it provides a wide range of scalability. For example, the 16 PEs ring-bus (350) architecture illustrated in FIG. 3A may be configured to invert one 4×4 matrix (i.e., matrix 1 to matrix 4), invert one 3×3 matrix (i.e., any 9 PEs), four 2×2 matrixes in parallel (i.e., anyone of matrix 1 to 4), and 16 1×1 matrix in parallel (i.e., using only a single PE).

As described later with reference to FIG. 3F, that the same 16 PEs ring-bus (350B), may be configured to invert one 8×8 matrix by configuring the matrix 1 to matrix 4 within the ring-bus (350B) into two matrix groups (i.e., matrix 1-2 and matrix 3-4), and iteratively processing the two matrix groups four times. FIG. 3E illustrates that the 8×8 matrix inversion may alternately be performed by cascading four 16 PEs ring-bus (350-1 to 350-4), where each of the ring-bus (350-1 to 350-4) is configured as a two matrix groups (i.e., matrix 1-2 and matrix 3-4). As described later with reference to FIG. 3F, that the same 16 PEs ring-bus (350B) that is designed to invert one 4×4 matrix may be configured to invert one 8×8 matrix by iteratively processing four times. FIG. 3E illustrates that one 8×8 matrix inversion may alternately be performed by cascading four 16 PEs ring-bus (350-1 to 350-4), where each of the ring-bus (350-1 to 350-4) is configured to processing two columns (sub-layer) of the 8×8 matrix inputs.

In this regard, the ring-bus architecture (350) may be flexibly configured to support a wide range of antenna dimensions, such as an LTE 1×1 real reciprocal on every tone (100×12) in one time interval (TTI), an LTE V 2×2 complex matrix inversion for each V-MIMO pair on every tone (80× 12) in one TTI, LTE with 4×4 complex matrix inversion, and LTE-A with 8×8 complex matrix inversion, to name a few.

FIG. 3B illustrates an exemplary input/output (I/O) controller (352) coupled to the bi-directional ring bus architecture of FIG. 3A, which initiates tokens to designated processing elements (PEs) to perform matrix inversion of input digital signal streams (332) from multiple antennas, according to an embodiment of disclosure. The I/O controller (352) facilitates input of data stream signals (332a to 332d), and facilitates completed and processed output signals (342a to 342d) to and from the clockwise ring (360) and the counter-clockwise ring (370). In addition, the I/O controller (352) includes an acknowledgment module (352-1), which receives acknowledgment signals (ACK) returned by the PEs in the ring-bus; a token generator (352-2), which generates initial clockwise tokens and initial counter-clockwise tokens for a designated PE in the ring-bus; and a result capture module (352-3), which captures returned results returned by the PEs in the ring-bus.

FIG. 3C illustrates an exemplary processing element (PE) (355), which is coupled to the bi-directional ring-bus architecture of FIG. 3A to perform matrix inversion of input digital signal streams from multiple antennas, according to an embodiment of disclosure. The PE (355) includes at least a first latch (355-1), a second latch (355-2), a single CORDIC core (355-3), a register (355-4) and a control unit (355-5). The bi-directional ring-bus architecture includes a clockwise ring (360) and a counter-clockwise ring (370). The first latch (355-1) is coupled to the clockwise ring (360) at a first dock (362), and the second latch (355-2) is coupled to the counter-clockwise ring (370) at a second dock (372).

Figure 1A:
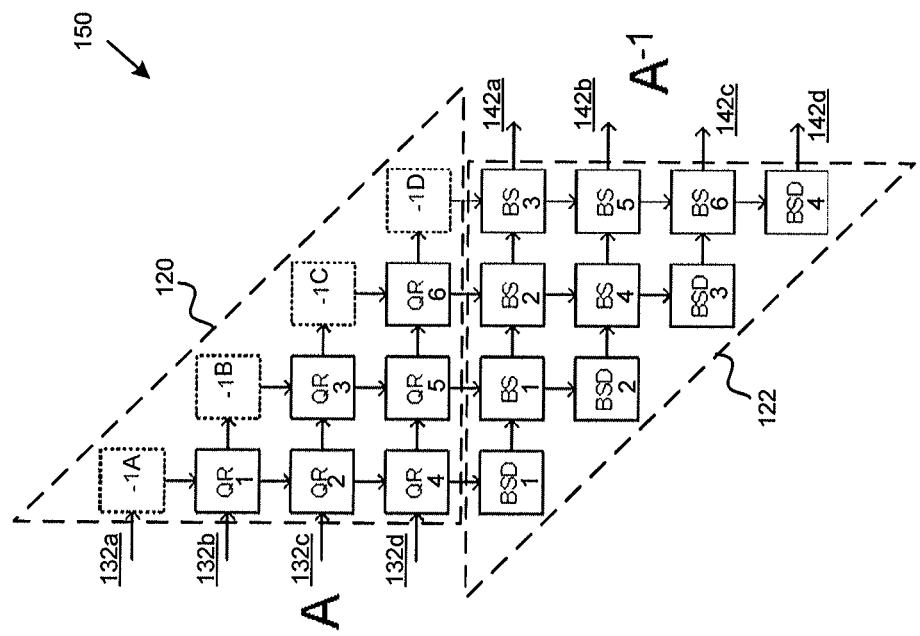
FIG. 1A illustrates a systolic array in a related art, performing a 4×4 matrix inversion on LTE digital signal streams.

The clockwise ring (360) may facilitate transmission or movement of signals or information in a horizontal direction (West to East), and the counter-clockwise ring (370) may facilitate transmission or movement of signals or information in a vertical direction (North to South), as in a systolic array (150) as shown in FIG. 1A. Each ring (clockwise ring (360) or counter-clockwise ring (370)) includes three sub-rings, namely, a Request ring (360-A), a Data ring (360-B) and an Acknowledgment ring (360-C).

The signals or information, which passes through the clockwise ring (360) and the counter-clockwise ring (370), may be designated as "token" (381), or more specifically, as clockwise token or counter-clockwise token, respectively. The first dock (362) and the second dock (372) of the PE (355) are responsible for initiating dispatch of, and accepting a clockwise token and a counter-clockwise token, respectively. The first dock (362) and the second dock (372) may either be in an active mode (ready to accept a clockwise token and a counter-clockwise token) or in an inactive mode (the PE (355) is busy processing the clockwise token and the counter-clockwise token).

The PE (355) in the ring-bus may be driven or triggered by two tokens, namely, the clockwise token and the counter-clockwise token. The PE (355) may also issue a new clockwise token and a new counter-clockwise token for another PE in the ring-bus, upon completion in processing the pending clockwise token and the counter-clockwise token. Each token (381) includes information, namely, a PE Address (381-1a) with a sequence stamp (SEQ) (381-1b), Data (381-2) and an Acknowledgment (ACK) (381-3).

The PE Address (381-1a) and the sequence stamp (SEQ) (381-1b) are both carried on the Request ring (360-A). The Data (381-2) is carried on the Data ring (360-B), and the Acknowledgment (ACK) (381-3) signal is carried on the Acknowledgment ring (360-C), respectively. The PE address (381-1a) on the token (381) corresponds to an address or location of the PE (355) on the Request ring (360-A).

The SEQ (381-1b) carries a sequence time stamp, which is used to resolve token order information (i.e., when the clockwise token or the counter-clockwise token is generated). The PE (355) on the bi-directional ring-bus can only be triggered if both the clockwise token and the counter-clockwise token have matching PE-addresses (381-1a) and a matching SEQ (381-1b) are captured by the first dock (362) and by the second dock (372), respectively.

The SEQ (381-1b) may facilitate asynchronous token processing by the PEs on the bi-directional ring-bus. For example, suppose that PE5 on the bi-directional ring-bus processes tokens (in both directions) faster than PE6. PE5 may have already generated and issued more than one token, say token 0 and token 1 (in both directions) to PE6. Since PE6 may take a longer time to process its pending token (in both directions), the first and the second docks of the PE6 may be in an "inactive mode" (which indicates that PE6 is busy processing pending tokens). PE6 may therefore, capture neither token 0 nor token 1 (in either or both directions). Accordingly, both token 0 and token 1 would stay on the Request ring (360-A) (in both directions), until PE6 becomes available or free.

The first and second docks (362, 372) on the PE6 may scan all passing clockwise tokens and counter-clockwise tokens on the clockwise ring (360) and the counter-clockwise ring (370), respectively. When the clockwise token and the counter-clockwise token destined to PE6 arrive, the first and second docks (362, 372) of PE6 first check the sequence stamp SEQ (381-b). If the SEQ (381-b) on both the clockwise token and the counter-clockwise token match, the first latch (355-1) and the second latch (355-2) of PE6 are triggered.

However, there is no guarantee that token 0 (with an earlier sequence stamp SEQ (381-b)) would be captured before token 1 (in both directions) by PE6. In this regard, the sequence stamp SEQ (381-1b) may help PE6 decide whether to accept token 1 before token 0. If PE6 is configured to process token 0 before token 1 from PE5, the first and second docks (362, 372) on the PE6 may scan all passing clockwise tokens and counter-clockwise tokens for token 0 from PE5.

Meanwhile, the other PEs (e.g., PE5) in the ring-bus may independently continue to process other new tokens in the bi-directional ring-bus according to the matched PE address (381-1a) and the matched sequence stamp SEQ (381-1b) (in both directions), irrespective of whether PE6 or other PEs in the bi-directional ring-bus start to process their tokens or in waiting mode. In this regard, the sequence stamp SEQ (381-1b) may help facilitate asynchronous token processing by the PEs on the bi-directional ring-bus. The token processing by the PEs on the bi-directional ring-bus, therefore, follows the sequence time stamp SEQ (381-b). Yet in another embodiment of the disclosure, the PE may be configured to process tokens following a first-in-first-out (FIFO) fashion or in a round robin queue fashion for other processing schemes.

Configuration codes may be pre-loaded to the control unit (355-5) to enable the PE (355) to carry out a QR decomposition (QRD) type, a back-substitution (BS) type or back-substitution delay (BSD) type of operation via the single CORDIC core (355-3) on the PE (355).

The embedded Data (381-2) associated with the PE address (381-a) and the sequence stamp SEQ (381-1b) in the token (381) are transmitted in the Data ring (360-B) (in both directions). More specifically, the embedded Data (381-2) may include at least data of the digital signal streams (332a to 332d), which are to be loaded into the plurality of registers (355-4) of the PE. QRD type, BS type or BSD type of operation may be carried out by the single CORDIC core (355-3) using the data stored in the plurality of registers (355-4), according to the pre-loaded codes of the control unit (355-5).

The Acknowledgment ACK (381-3) signal is generated by the PE (355) once the PE (355) has completed its operation on the embedded Data (381-2) on the tokens (in both directions). The ACK (381-3) is sent to the I/O controller (352) on the Acknowledgment ring (360-C) (in both directions) to signal to the I/O controller (352) that the processing of the pending tokens (in both directions) has been completed. The I/O controller (352) monitors the ACK (381-3) signals from the PEs on the bi-directional ring-bus.

Once the I/O controller (352) receives one or more ACK (381-3) signals from one or more designated PEs (355), the I/O controller (352) may input one or more new signals and initiate corresponding new tokens (in both directions) into the bi-directional ring-bus to the one or more designated PEs (355). In this way, the ACK (381-3) signal acts as a control signal to keep the I/O controller (352) from initiating and sending too many, or initiating and sending too few tokens to the bi-directional ring-bus.

Figure 1B:
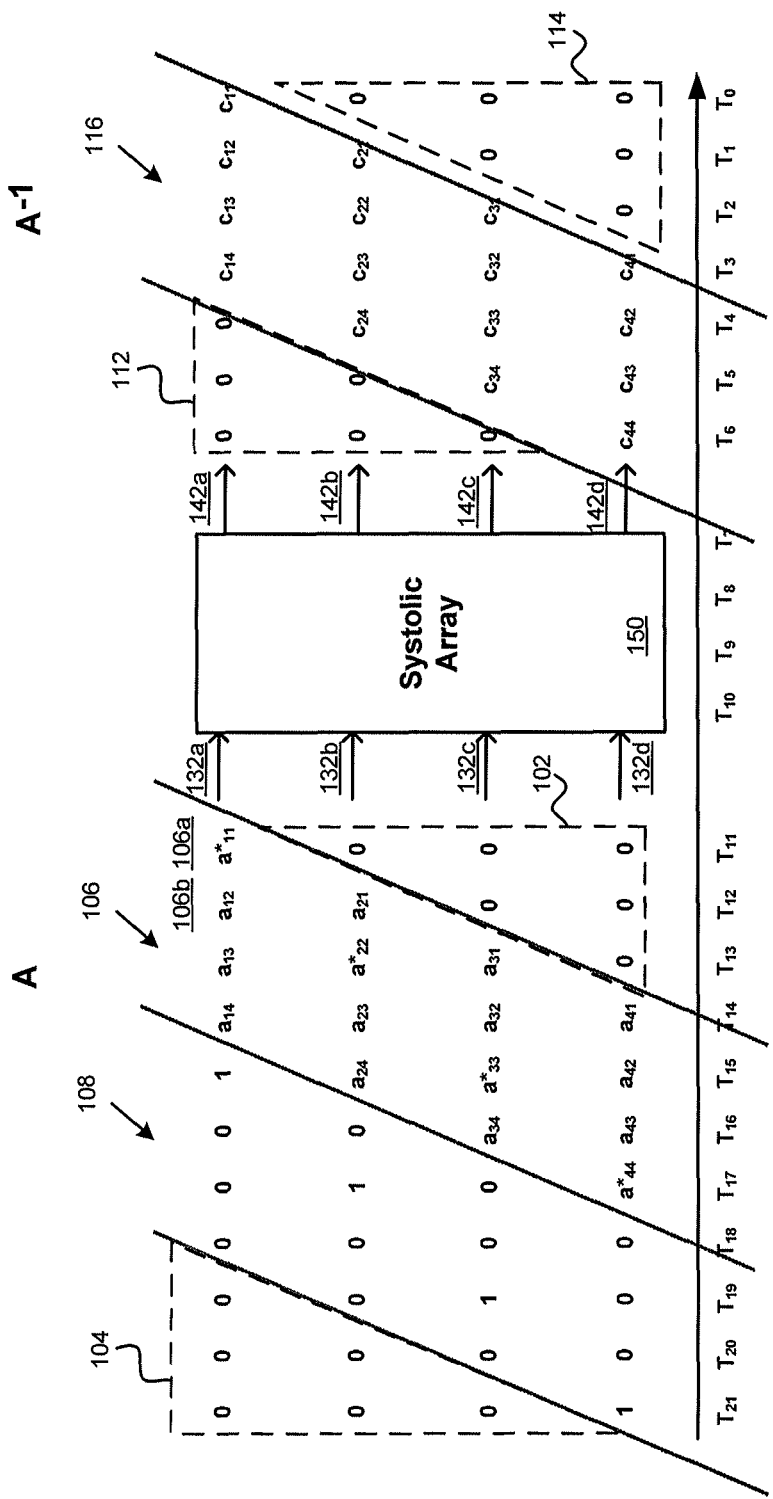
FIG. 1B illustrates a systolic array of FIG. 1 in a related art performing a 4×4 matrix inversion on LTE digital signal streams, with the column data of input matrix being deliberately skewed prior to processing.

FIG. 3D illustrates an implementation of a bi-directional ring-bus architecture of FIG. 3A that performs matrix inversion of input digital signal streams from multiple antennas, without requiring the column data of the input matrix to be deliberately skewed prior to processing, according to an embodiment of disclosure. In a sense, the bi-directional ring-bus architecture of FIG. 3A may be realized as a "ring-bus"

systolic array (350A) to support 4×4 matrix inversion operations of a traditional systolic array (150) as shown in FIG. 1B.

As described in FIG. 3C, digital signal streams (332a to 332d) (as tokens) are horizontally processed (West to East) by the clockwise ring (360), and vertically processed (North to South) by the counter-clockwise ring (370). In addition, the token processing by the PEs on the bi-directional ring-bus is asynchronous, independent of the start time and completion time of the previous PE or any other PEs in the bi-directional ring-bus. To simply put, the individual ring-bus PE does not need to wait for the longest processing time among all the other PEs before issuing or transmitting the results (as new tokens) to the ring-bus. In this regard, the "starting zeros" and "ending zeros" are no longer necessary in the bi-directional ring-bus architecture. Accordingly, the input matrixes (306, 308) are not skewed, as shown in FIG. 3D. Likewise, the output inversed matrixes (312, 316) are also not skewed. Therefore, compared to the traditional systolic array (150) (see FIG. 1B), the bi-directional ring-bus architecture is more superior in reduction of latency by virtue of removing the processing time of "starting zeros and ending zeros" in the input matrixes thus eliminating the waiting time of the longest operation to complete.

In addition, FIG. 3C also illustrates that only a single CORDIC core (355-3) is used in each PE (355). Therefore, a 4×4 matrix inversion in the bi-directional ring-bus architecture may be accomplished by using only 16 CORDIC cores, compared to 64 CORDIC cores required in the traditional systolic array (150). In this regard, the reduction of CORDIC cores further reduces latency by virtue of fewer CORDIC core iterations within the PE, and thus substantially reduces the power consumption for the matrix inversion operations. Furthermore, the token rotation frequency within the bi-directional ring-bus may be increased to increase CORDIC iterations or processing, which may improve precision, or further reduce latency on matrix inversion operations.

FIG. 3E illustrates using a multiple bi-directional ring-bus configuration to perform matrix inversion of input digital signal streams from an increased multiple antennas size, according to an embodiment of disclosure. FIG. 3E illustrates that the 8×8 matrix inversion may alternately be performed by cascading four 16 PEs ring-bus (350-1 to 350-4), where each of the ring-bus (350-1 to 350-4) is configured as a two matrix groups (i.e., matrix 1-2 and matrix 3-4). where each of the ring-bus (350-1 to 350-4) is configured to processing two columns (i.e., a sub-layer) of the 8×8 matrix inputs. Data of the input digital signal streams (332a to 332d) may enter the I/O controller of ring-bus (350-1) (as tokens), and exit through the same I/O controller after the first sub-layer is processed. The processed data (as tokens) may be transmitted to complete the remaining six matrix inversions by the ring-buses (350-2 to 350-4). The benefit of using a cascading configuration is to improve speed, especially when a large matrix dimension needs to be inversed. An optional cache memory (390A) may be used between ring-buses as data buffer.

FIG. 3F illustrates using the same single bi-directional ring-bus architecture of FIG. 3A to perform matrix inversion of input digital signal streams from an increased multiple antennas size, according to an embodiment of disclosure. It may further be shown that the same 16 PEs ring-bus (350B) may be configured to invert one 8×8 matrix by iteratively processing the four sub-layers (two columns) of the 8×8 matrix input. A cache can be used to buffer the outputs of each sub-layer. Data of the input digital signal streams (332a to 332d) may enter the I/O controller of ring-bus (350-B) (as tokens) to complete the first sub-matrix processing. The tokens are recirculated through the same I/O controller to perform the next three iterations to complete the 8×8 matrix inversions.

It should be pointed out that the above bi-directional ring-bus architecture with CORDIC cores may be implemented as an integrated circuit (IC) chip individually, or in combination with other processing blocks such as DSP, ALUs, controllers or microprocessors to expand hardware/software processing capabilities or applications. The bi-directional ring-bus architecture with CORDIC cores may be implemented in mobile and network devices, such as in base stations, network router, network switches, mobile handsets, wireless tablets, game consoles, video graphics interface, to name a few.

The following summarizes some of the advantages of using a bi-directional ring-bus architecture over a traditional systolic array (150):

(1) Latency reduction in matrix inversion by virtue of eliminating "starting and ending zeros", using fewer CORDIC cores.

(2) Configurable precision. Precision is proportional to the iterations of processing by the CORDIC cores. Processing iterations may be increased by increasing tokens rotation frequency in the ring-bus.

(3) Lower power consumption by virtue of using a single CORDIC core in the PE. Unlike in a traditional systolic array, one node may have three or four CORDIC cores, in contrast with the ring-bus architecture, where only a single CORDIC core is needed for the node.

(4) Reduction of chip size area by virtue of a less complex design using fewer CORDIC cores.

(5) Flexible to adapt to any antenna dimensions (e.g., 1×1, 2×2, 3×3, 4×4, 8×8 or larger antenna dimension) in the system by configuring the PEs in the bi-directional ring-bus architecture to any matrix size to perform parallel or serial inverse matrix processing, and performing multiple iterations on the same bi-directional ring-bus architecture with space reduction.

(6) Scalable to cascade multiple ring-bus architecture for speed and to handle increased system complexity.

(7) The ring-bus architecture is a good candidate for asynchronous (self-timed) hardware design which is more flexible. In this regard, asynchronous processing does not have to wait for a previous step to complete before starting the processing, unlike the traditional systolic array where the processing is contingent on the result of the previous step.

Those of ordinary skill in the art should understand that all or a part of the steps in the method according to the embodiments of the present disclosure can be implemented by a program instructing relevant hardware, and the program may be stored in a non-transitory computer readable storage medium, such as a ROM/RAM, a magnetic disk, or an optical disk, which are executed in a machine, such as an end-user mobile device, in a server, or cloud computing infrastructure.

It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for processing multiple antenna signals, comprising:
receiving input signals from multiple antennas;
converting the received input signals into a plurality of input digital signal streams; and performing QR decomposition (QRD) based matrix inversion on the plurality of input digital signal streams via a bi-directional ring bus processing architecture that comprises:
- a bi-directional ring bus, with a first ring bus having signal flow in a clockwise direction, a second ring bus having signal flow in a counter-clockwise direction;
- an input/output (I/O) controller coupled to the first and the second ring bus, respectively;
- a plurality of processing elements (PEs), each of the plurality of PEs is coupled to the first and the second ring bus, respectively, wherein each of the plurality of PEs comprises at least one Coordinate Rotation Digital Computer (CORDIC) core for performing CORDIC iterations on the plurality of input digital signal streams to produce inversed matrix signals.

2. The method according to claim 1, wherein each of the plurality of PEs comprises a control unit, at least one register, an input latch and an output latch, wherein the input latch and the output latch are each coupled via a corresponding control dock of the first ring bus and a corresponding control dock of the second ring bus.

3. The method according to claim 2, wherein each of the plurality of PEs is triggered to process the plurality of input digital signal streams when both the input latch and the output latches are each triggered by a respective first and second token received from the first and the second ring bus.

4. The method according to claim 2, further comprising pre-loading configuration codes to the control unit in each of the plurality of PEs to enable each of the plurality of PEs to perform at least one of: a QR decomposition, a back-substitution (BS), and a back-substitution delay (BSD) type processing.

5. The method according to claim 1, wherein the bi-directional ring bus processing architecture operates in an asynchronous mode, wherein each of the plurality of PEs starts and ends processing of the plurality of input digital signal streams independently, without having to synchronize the processing with another PE in the bi-directional ring bus processing architecture at any time instant.

6. The method according to claim 1, wherein each of the plurality of PEs processes the plurality of input digital signal streams without having to insert starting zeros or ending zeros to anyone of the plurality of input digital signal streams.

7. The method according to claim 1, wherein the I/O controller performs functions comprising one or more of: inputting the plurality of input digital signal streams, outputting results from the plurality of PEs in the bi-directional ring bus architecture, monitoring acknowledges and generating initial tokens for one or more of the plurality of PEs.

8. The method according to claim 1, further comprising cascading a plurality of the bi-directional ring bus processing architecture to increase inverse matrix processing capacity, when higher number of multiple antennas are used.

9. The method according to claim 1, further comprising integrating the bi-directional ring bus processing architecture into a digital signal processing (DSP) core to expand hardware/software processing functions and to reduce chip size.

10. The method according to claim 9, wherein the DSP core comprises an execution core and a matrix computation block, wherein the execution core executes op codes and only a single op code to trigger the matrix computation block.

11. An apparatus for processing multiple antenna signals comprises:
- a receiver which receives input signals from multiple antennas;
- one or more processing circuits which processes the received input signals into a plurality of input digital signal streams;
- a bi-directional ring bus processing architecture which performs QR decomposition (QRD) based matrix inversion on the plurality of input digital signal streams, wherein the bi-directional ring bus processing architecture comprises:
  - a bi-directional ring bus, with a first ring bus having signals flow in a clockwise direction, a second ring bus having signals flow in a counter-clockwise direction;
  - an input/output (I/O) controller coupled to the first and the second ring bus, respectively;
  - a plurality of processing elements (PE), each of the plurality of PEs is coupled to the first and the second ring bus, respectively, wherein each of the plurality of PEs comprises at least one Coordinate Rotation Digital Computer (CORDIC) core for performing CORDIC iterations on the plurality of input digital signal streams to produce inversed matrix signals.

12. The apparatus according to claim 11, wherein each of the plurality of PEs comprises a control unit, at least one register, an input latch and an output latch, wherein the input latch and the output latch are each coupled via a corresponding control dock of the first ring bus and a corresponding control dock of the second ring bus.

13. The apparatus according to claim 12, wherein each of the plurality of PEs is triggered to process the plurality of input digital signal streams when both the input latch and the output latch are each triggered by a respective first and second token received from the first and the second ring bus.

14. The apparatus according to claim 12, wherein the control unit in each of the plurality of PEs comprises pre-loaded configuration codes, wherein each of the plurality of PEs has been enabled to perform at least one of: a QR decomposition, a back-substitution (BS) and a back-substitution delay (BSD) type processing.

15. The apparatus according to claim 11, wherein the bi-directional ring bus processing architecture operates in an asynchronous mode, wherein each of the plurality of PEs starts and ends processing of the plurality of input digital signal streams independently, without having to synchronize the processing with another PE in the bi-directional ring bus processing architecture at any time instant.

16. The apparatus according to claim 11, wherein each of the plurality of PEs processes the plurality of input digital signal streams without having to insert starting zeros or ending zeros to anyone of the plurality of input digital signal streams.

17. The apparatus according to claim 11, wherein the apparatus comprises a network device selected from one of: a base station, a wireless handset, a wireless tablet device, a game console, a network router or a network switch, and wherein the I/O controller is enabled to perform one or more of: input the plurality of input digital signal streams, output results from the plurality of PEs in the bi-directional ring bus architecture, monitor acknowledges and generate initial tokens for one or more of the plurality of PEs.

18. The apparatus according to claim 11, wherein a plurality of the bi-directional ring bus processing architecture are cascaded to increase the inverse matrix processing capacity, when higher number of multiple antennas are used.

19. The apparatus according to claim 11, wherein the bi-directional ring bus processing architecture has been integrated with a digital signal processing (DSP) core as a single chip to expand hardware/software processing functions and to reduce chip size, wherein the DSP core comprises an execution core and a matrix computation block, wherein the execution core executes op codes and only a single op code to trigger the matrix computation block.

20. A matrix computation unit comprises:
- a bi-directional ring bus processing architecture which performs QR decomposition (QRD) based matrix inversion on a plurality of input digital signal streams, wherein the bi-directional ring bus processing architecture comprises:
  - a bi-directional ring bus, with a first ring bus having signals flow in a clockwise direction, a second ring bus having signals flow in a counter-clockwise direction;
  - an input/output (I/O) controller coupled to the first and the second ring bus, respectively;
  - a plurality of processing elements (PE), each of the plurality of PEs is coupled to the first and the second ring bus, respectively, wherein each of the plurality of PEs comprises at least one Coordinate Rotation Digital Computer (CORDIC) core for performing CORDIC iterations on the plurality of input digital signal streams to produce inversed matrix signals.

* * * * *